United States Patent [19]
Urata et al.

[11] Patent Number: 5,589,904
[45] Date of Patent: Dec. 31, 1996

[54] CAMERA WHICH PERFORMS MOTION COMPENSATION FOR SEQUENTIAL PHOTOGRAPHS BY CONTINUOUSLY DETECTING MOTION UNTIL THE FINAL PHOTOGRAPH IS TAKEN

[75] Inventors: Keishi Urata; Toshiyuki Nakamura, both of Tokyo, Japan

[73] Assignee: Nikon Corporation, Tokyo, Japan

[21] Appl. No.: 571,178

[22] Filed: Dec. 12, 1995

[30] Foreign Application Priority Data

Dec. 14, 1994 [JP] Japan .................................. 6-310516

[51] Int. Cl.⁶ .................................................. G03B 5/00
[52] U.S. Cl. ...................................... 396/55; 396/48
[58] Field of Search ..................... 354/400, 412, 354/430, 70, 202, 195.1, 195.12, 173.1, 173.11, 267.1; 348/208

[56] References Cited

U.S. PATENT DOCUMENTS

| | | | |
|---|---|---|---|
| 5,192,964 | 3/1993 | Shinohara et al. | 354/202 |
| 5,216,459 | 6/1993 | Kosaka et al. | 354/400 |
| 5,421,334 | 8/1993 | Kobayashi et al. | 354/195.1 |

*Primary Examiner*—A. A. Mathews
*Attorney, Agent, or Firm*—Staas & Halsey

[57] ABSTRACT

A camera which performs high precision motion compensation while multiple, serial photographs are taken, by stabilizing the output signal of a motion sensor until the final photograph is taken. An exposure control mechanism causes the camera to take a first photograph after a first time period elapses from the initiation of exposure, and to take a second photograph after a second time period elapses from the first photograph being taken. A motion detector continuously detects motion affecting the camera prior to the first photograph being taken until after the second photograph is taken, and produces a corresponding output signal. A reference level mechanism determines a reference level from the output signal of the motion detector. The reference level is a level of the output signal which indicates that approximately no motion is affecting the camera. The reference level mechanism updates the reference level prior to the first photograph being taken until after the second photograph is taken, to produce a current reference level. In addition, a motion compensation mechanism receives the current reference level from the reference level mechanism and the output signal of the motion detector, and accordingly compensates for motion affecting the camera.

11 Claims, 6 Drawing Sheets

CAMERA WHICH PERFORMS MOTION COMPENSATION FOR SEQUENTIAL PHOTOGRAPHS BY CONTINUOUSLY DETECTING MOTION UNTIL THE FINAL PHOTOGRAPH IS TAKEN

BACKGROUND OF THE INVENTION

1. Field of the Invention

The present invention relates to a camera equipped with a motion compensation device to suppress image blur resulting from motion of the camera and, more particularly, a camera which performs motion compensation for sequential photographs by continuously detecting motion until the final photograph is taken.

2. Description of the Related Art

Optical systems project an image onto an image plane. Conventional image blur suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system. Conventional cameras use a motion compensation device to suppress image blur resulting from motion of the camera. Such motion is typically caused by hand tremors of the photographer.

In a camera equipped with a motion compensation device, a motion sensor detects the amount of motion affecting the camera by detecting the angular velocity or acceleration produced by the motion. The motion sensor then produces an output signal in correspondence with the amount of detected motion. The direct current component of the sensor output is eliminated, and the alternating current component of the sensor output is received by a sensor circuit. The sensor circuit determines the amount of motion from the amplitude of the alternating current component of the motion sensor output signal.

The output signal produced by the motion sensor is generally very small. Therefore, the sensor circuit includes an amplifier to amplify the output signal of the motion sensor. To improve the motion detection sensitivity of the motion sensor, the sensor circuit may increase the power source voltage supplied to the amplifier. However, the amount of power which can be supplied is limited.

To accurately detect the amount of motion affecting the camera, a reference level of the amplified signal (that is, the signal level when there is no motion affecting the camera) is detected. For example, the reference level can be derived by taking an average of the output of the sensor circuit amplifier during a time period when there is a margin in relation to the motion cycle. However, as previously described, the direct current component of the motion sensor output signal is eliminated. Therefore, the reference level of the amplified signal cannot be easily detected. Poor detection of the reference level produces inaccurate motion compensation due to errors in the reference level. The precision of the reference level is improved as the time period is increased. In other words, the precision of the reference level is improved when the average of the output of the sensor circuit amplifier is taken over a longer period of time.

Further, immediately after being started, the motion sensor requires a small amount of time until its output signal stabilizes. However, when executing a series of continuous photographs, the power source of the motion sensor is turned ON and OFF for each individual photographic operation, thereby requiring a new determination of the reference level for each photographer. This conventional approach does not utilize the reference level determined for the proceeding photograph.

SUMMARY OF THE INVENTION

Accordingly, it is an object of the present invention to provide a camera having a motion compensation device which performs high precision motion compensation while multiple, serial photographs are taken, by stabilizing the output signal of a motion sensor until the final photograph is taken.

It is a further object of the present invention to provide a camera having a motion compensation device which performs high precision motion compensation by deriving a precise, accurate reference level.

Additional objects and advantages of the invention will be set forth in part in the description which follows, and, in part, will be obvious from the description, or may be learned by practice of the invention.

Objects of the present invention are achieved by providing a camera which takes a first photograph upon initiation of exposure, and then takes a second photograph after the first photograph is taken. An exposure control mechanism causes the camera to take the first photograph after a first time period elapses from the initiation of exposure, and to take the second photograph after a second time period elapses from the first photograph being taken. A motion detector continuously detects motion affecting the camera prior to the first photograph being taken until after the second photograph is taken.

Moreover, objects of the present invention are achieved by providing the camera with a motion detector which produces an output signal corresponding to the amount of detected motion, and with a reference level mechanism which receives the output signal of the motion detector and determines a reference level of the output signal. The reference level is a level of the output signal which indicates that approximately no motion is affecting the camera. The reference level mechanism updates the determined reference level prior to the first photograph being taken until after the second photograph is taken, to produce a current reference level. In addition, a motion compensation mechanism receives the current reference level from the reference level mechanism and the output signal of the motion detector, and compensates for motion affecting the camera in accordance with the current reference level and the output signal of the motion detector.

Additional objects of the present invention are achieved by providing the camera with a compensation lens which is movable to compensate for motion affecting the camera. The motion compensation mechanism compensates for motion by moving the compensation lens. Moreover, the reference level mechanism is prohibited from updating the reference level while the motion compensation mechanism is moving the compensation lens.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
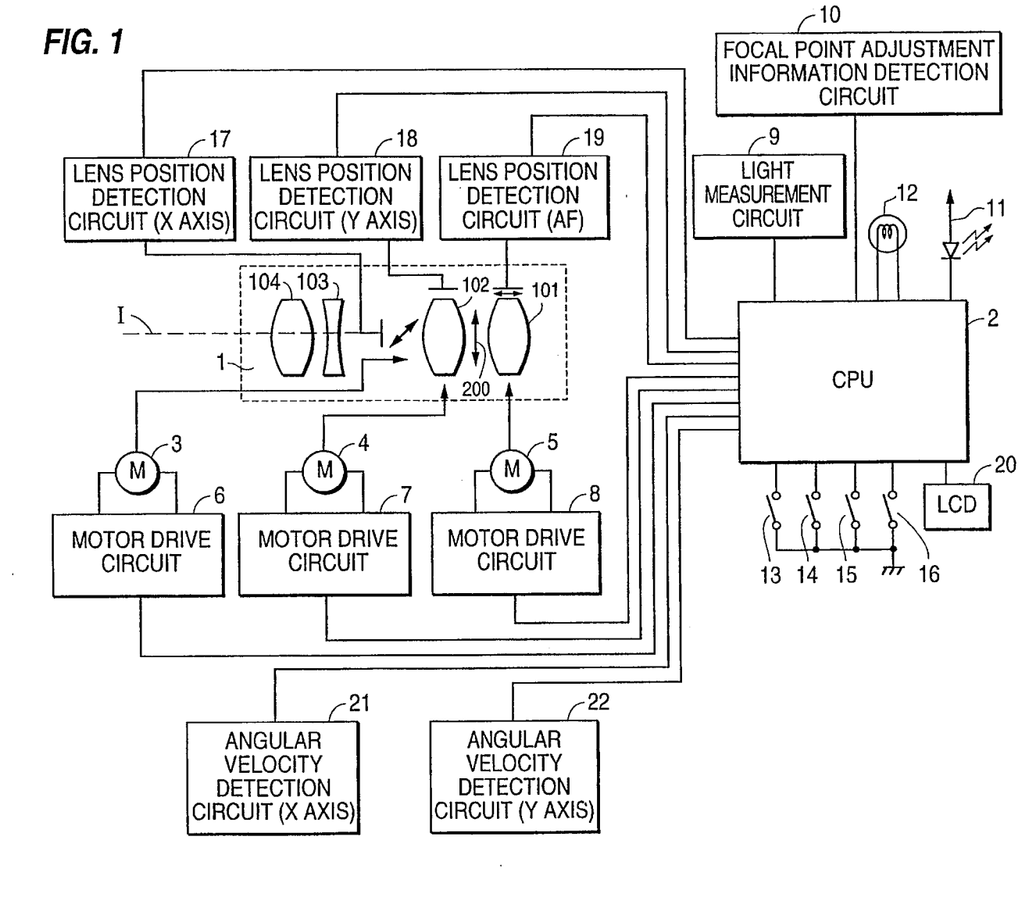
FIG. 1 is a block diagram of a camera equipped with a motion compensation device, according to an embodiment of the present invention.

FIG. 1 is a block diagram of a camera equipped with a motion compensation device, according to an embodiment of the present invention. Referring now to FIG. 1, a photographic lens group 1 has four lens groups 101, 102, 103 and 104, therein. Lens group 101 (hereinafter "focus lens" 101) is a focus lens that is moveable in the optical axis direction I. Lens group 102 (hereinafter "compensation lens" 102) is a lens that is moveable in the X axis (horizontal) direction 200 and the Y axis direction (not illustrated, but perpendicular to the X axis direction 200) to compensate for motion. The X axis direction 200 and the Y axis direction are both orthogonal to the optical axis direction I of photographic lens group 1.

A central processing unit (CPU) 2 controls the movement of compensation lens 102 based on the amount of motion detected. CPU 2 is preferably a one-chip microcomputer that includes a timer, an analog/digital (A/D) converter and a counter. CPU 2 controls all processes and the processing sequences in the camera.

Motor 3 moves compensation lens 102 in the X axis direction 200. Motor drive circuit 6 drives motor 3. Motor 4 moves compensation lens 102 in the Y axis direction. Motor drive circuit 7 drives motor 4. Motor 5 moves focus lens 101 in the optical axis direction I. Motor drive circuit 8 drives motor 5. Motor drive circuits 6, 7 and 8 drive motors 3, 4 and 5, respectively, by changing the pulse width of drive signals in correspondence with the amount of motor drive, that is, by duty drive. Drive direction signals and a drive duty signals are produced and supplied from CPU 2 to the motor drive circuits 6, 7 and 8, respectively. The drive direction signals indicate the drive direction for motors 3, 4 and 5, respectively. The drive duty signals indicate the amount of drive for motors 3, 4 and 5, respectively. Such driving of motors is known in the art.

The rotation of motors 3 and 4 is converted to linear motion by a compensation lens drive mechanism system (not illustrated), to drive compensation lens 102 by motors 3 and 4 in the X axis direction 200 and the Y axis direction, respectively. The rotation of motor 5 is converted to linear motion by a focus lens drive mechanism system (not illustrated) to move focus lens 101 in the optical axis direction I of photographic lens group 1.

A light measurement circuit 9 measures the subject brightness. A focal point adjustment information detection circuit 10 detects focal point adjustment information. A motion display device 11 displays an indication of the amount of motion affecting the camera. A red eye reduction lamp 12 is used to reduce red eye.

A main switch 13 is turned ON to supply power to all camera components requiring power. When main switch 13 is turned ON, main switch 13 maintains this position. The camera has a release button (not illustrated) having a half-push position and a full-push position. A photographer pushes the release button to the half-push position to initiate various photographic preparatory processes, such as range finding and photometry. The photographer pushes the release button to the full-push position to initiate an exposure operation (that is, to cause the shutter to release and take a photograph). A half push switch 14 turns ON when the release button is pushed to the half-push position, and stays ON only for the time during which the release button is held in the half-push position. A release switch 15 turns ON when the release button is pushed to the full-push position, and stays ON only for the time during which the release button is held in the full-push position.

The camera has the following photographic modes: red eye mode, single self mode, double self mode, and release mode. When in red eye mode, the camera reduces "red eye". "Red eye" is a phenomenon of the eyes appearing "red" when photographed as a result of the light of an electronic flash device reflecting on the capillaries on the back of the eyes of a person being photographed. To adjust for red eye when in red eye mode, exposure is executed after the pupils are made to close by emitting, prior to exposure, a weak light (referred to as "pre-illumination") from an electronic flash device. Pre-illumination is emitted by red eye reduction lamp 12.

When in single self mode, a self-timer (such as the timer (not illustrated) included in CPU 2) is used to count a predetermined period of time after release switch 15 goes ON. The shutter is released after the predetermined time elapses. For example, single self mode allows a photographer to set the camera on a table or a tripod, press the release button, and then move in front of the camera to allow the photographer to be captured in the resulting photograph. In effect, single self mode allows a delay from the time the release button is pushed to the full-push position until a photograph is taken.

When in double self mode, the shutter is operated for a second time after the predetermined period of time elapses after the single self mode is completed. In other words, the camera takes two separate, sequential photographs. The first photograph is taken after the predetermined period of time lapses from the pressing of the release button to the full-push position. The self-timer then counts the predetermined period of time from the taking of the first photograph. After the predetermined period of time lapses from the taking of the first photograph, the camera takes a second photograph. In effect, double self mode allows two delayed photographs to be taken. CPU 2 includes a flag DS (not illustrated) to indicate whether or not the camera is in the first photographic frame of double self mode. Flag DS is initially set at "0". When CPU 2 confirms that the camera is in the first photographic frame of double self mode, flag DS changes from "0" to "1" (see, for example, step S32 in FIG. 5, discussed later).

When in release mode, the camera simply takes a photograph when the release button is pushed to the full-push position. Release mode is considered to be the "normal" photographic mode.

A mode switch 16 indicates which photographic mode the camera is in. Each time mode switch 16 is set to the ON position, the photographic mode changes in the following order: When in release mode, the photographic mode changes to red eye mode; when in red eye mode, the photographic mode changes to single self mode; when in single self mode, the photographic mode changes to double self mode; and when in double self mode, the photographic mode changes to release mode. Moreover, once mode switch 16 is set in the ON position, mode switch 16 maintains that state and the camera stays in the corresponding photographic mode.

Liquid crystal display (LCD) 20 displays the current photographic information. For example, LCD 20 displays the photograph frame number, the photographic mode, and the strobe mode.

A lens position detection circuit 17 detects the position of compensation lens 102 in the X axis direction 200. A lens position detection circuit 18 detects the position of compensation lens 102 in the Y axis direction. Pulses corresponding to the amount of movement of compensation lens 102 are output from lens position detection circuit 17 and lens position detection circuit 18 and supplied to CPU 2. CPU 2 detects the position and amount of movement of compensation lens 102 by measuring these pulses. Moreover, CPU 2 detects the movement velocity of compensation lens 102 by the amount of movement per specified unit of time.

A lens position detection circuit 19 detects the position of focus lens 101. Pulses corresponding to the amount of movement of focus lens 101 are output from lens position detection circuit 19 and supplied to CPU 2. CPU detects the position and amount of movement of focus lens 101 by measuring these pulses. Moreover, CPU 2 detects the movement velocity of focus lens 101 by the amount of movement per specified unit of time.

An angular velocity detection circuit 21 detects the angular velocity based on motion in the X axis direction, and produces a corresponding output signal. An angular velocity detection circuit 22 detects the angular velocity based on motion in the Y axis direction, and produces a corresponding output signal. The output signals of angular velocity detection circuits 21 and 22 change in correspondence with the amount of angular velocity. According to the present embodiment of the present invention, the output signals of angular velocity detection circuits 21 and 22 increase as the amount of angular velocity increases; however, the present invention is not intended to be so limited. For example, the output signals of angular velocity detection circuits 21 and 22 can decrease as the amount of angular velocity increases.

Figure 2:
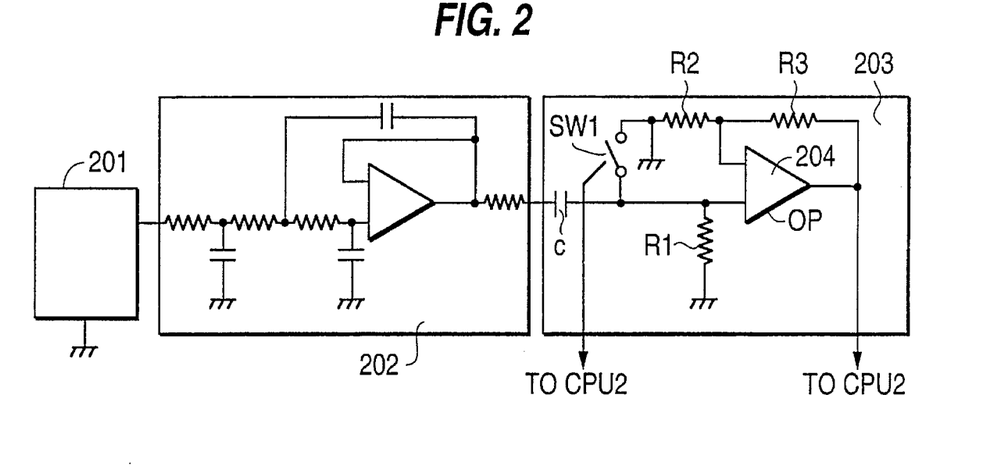
FIG. 2 is a circuit diagram of an angular velocity detection circuit, according to an embodiment of the present invention.

FIG. 2 is a circuit diagram of an angular velocity detection circuit (such as angular velocity detection circuit 21 or 22 in FIG. 1), according to an embodiment of the present invention. Referring now to FIG. 2, an angular velocity sensor 201 detects the angular velocity produced by motion, and produces a corresponding output signal. The output signal from angular velocity sensor 201 is provided to a low pass filter 202. Low pass filter 202 eliminates high frequency component noise included in the output signal of angular velocity sensor 201. The output of low pass filter 202 is provided to a high pass filter and amplifier 203.

High pass filter and amplifier 203 eliminates low frequency component noise included in the output of low pass filter 202, and amplifies the output of low pass filter 202. High pass filter and amplifier 203 includes an internal capacitor C and a resistor R1 forming a high pass filter, and an operational amplifier (OP amp) 204 as an amplifier. The output of OP amp 204 is provided to CPU 2 (see FIG. 1). Moreover, an analog switch SW1 is used to initialize the angular velocity detection circuit (for example, for initializing angular velocity detection circuits 21 and 22), and is connected to the input terminal of one side of OP amp 204. Analog switch SW1 is controlled by CPU 2.

Figure 3:
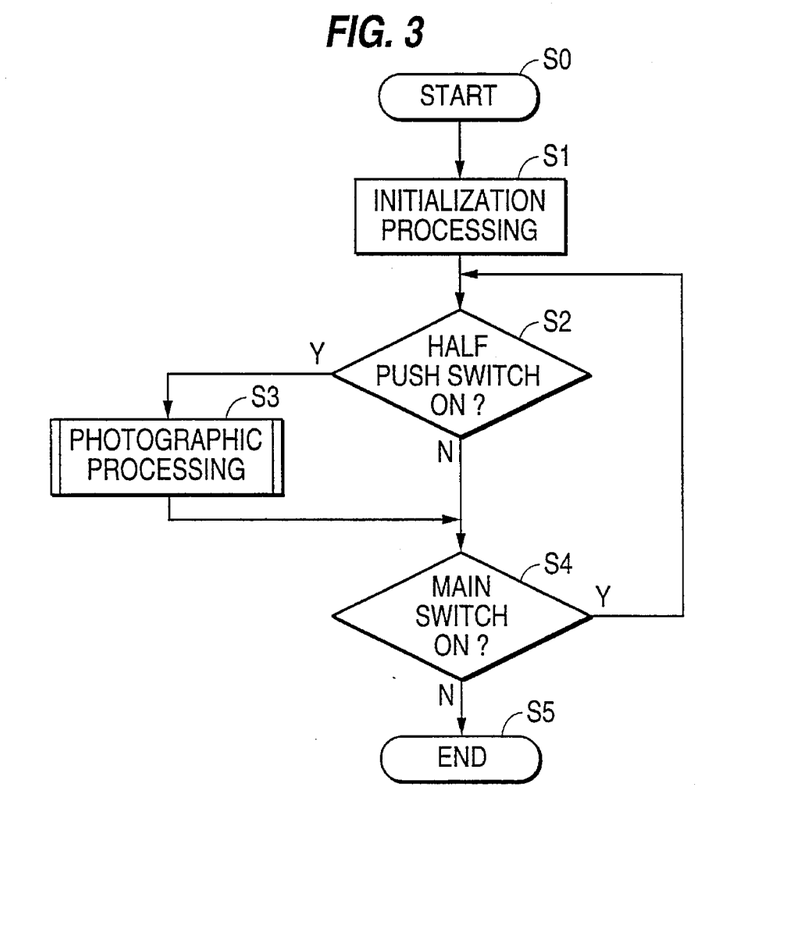
FIG. 3 is a flow chart illustrating a main processing of the central processing unit (CPU) of the camera illustrated in FIG. 1, according to an embodiment of the present invention.

FIG. 3 is a flow chart illustrating a main processing sequence of CPU 2, according to an embodiment of the present invention. Referring now to FIG. 3, the process starts in step SO when main switch 13 is turned ON. From step S0, the process moves to step S1, where CPU 2 initializes registers, counters and other elements (not illustrated) inside CPU 2. From step S1, the process moves to step S2, where it is determined whether or not half-push switch 14 is ON. If half-push switch 14 is ON (indicated that the photographer has pushed the release button to the half-push position) in step S2, the process moves to step S3, where photographic processing is performed. If half-push switch 14 is not ON (indicating that the photographer has not pushed the release button to the half-push position) in step S2, the process moves to step S4, where it is determined whether or not main switch 13 is ON. If main switch 13 is ON in step S4, the process returns to step S2. If main switch 13 is not ON in step S4, the process moves to step S5 where processing is ended.

Moreover, although not illustrated in FIG. 3, when a specified time has elapsed from the time that the power source of angular velocity detection circuits 21 and 22 is turned ON, CPU 2 initializes angular velocity detection circuits 21 and 22 by turning analog switch SW1 ON.

Figure 4:
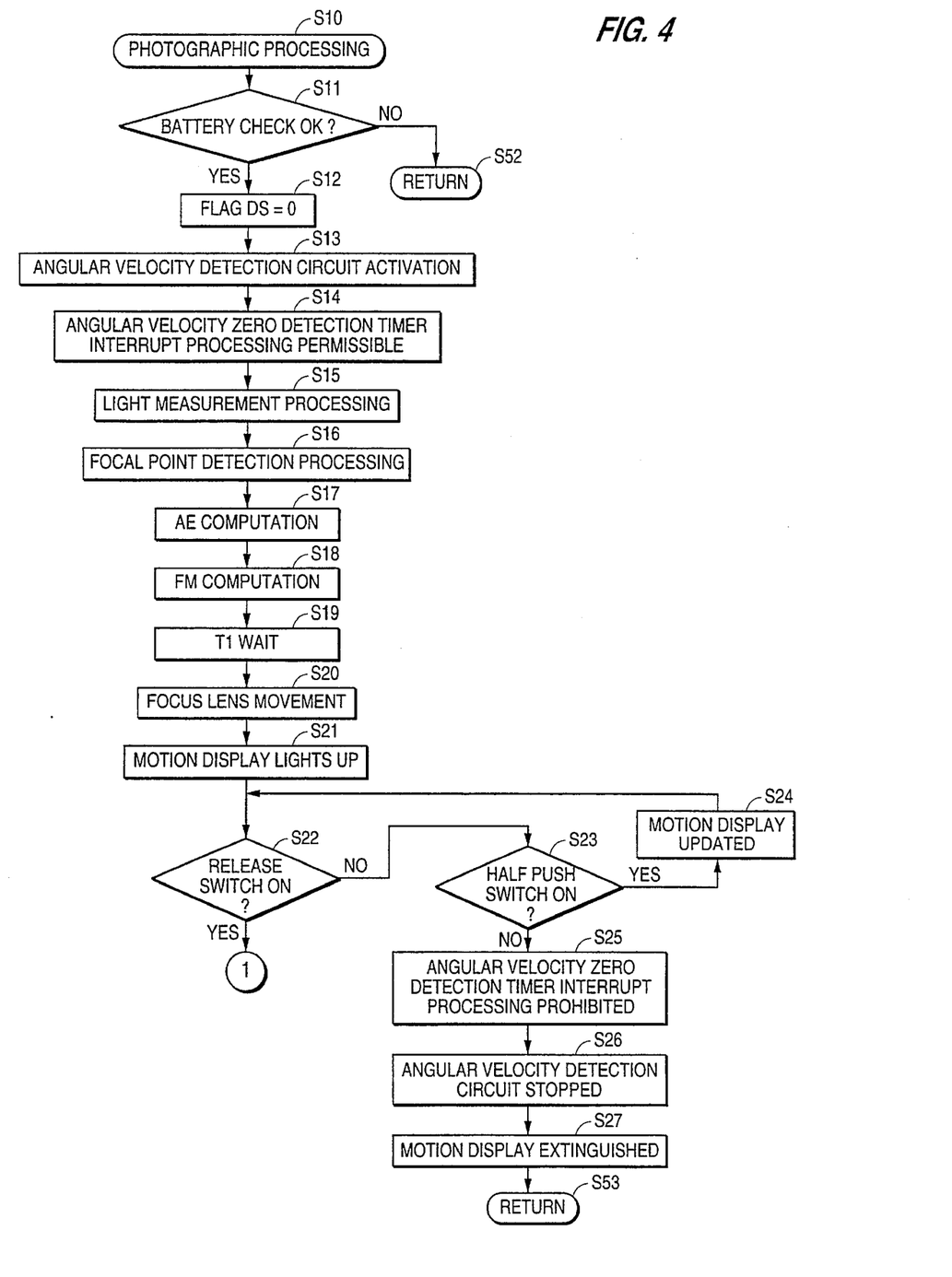
FIGS. 4 and 5 are flow charts illustrating the photographic processing of step S3 in FIG. 3, according to an embodiment of the present invention.
Figure 5:
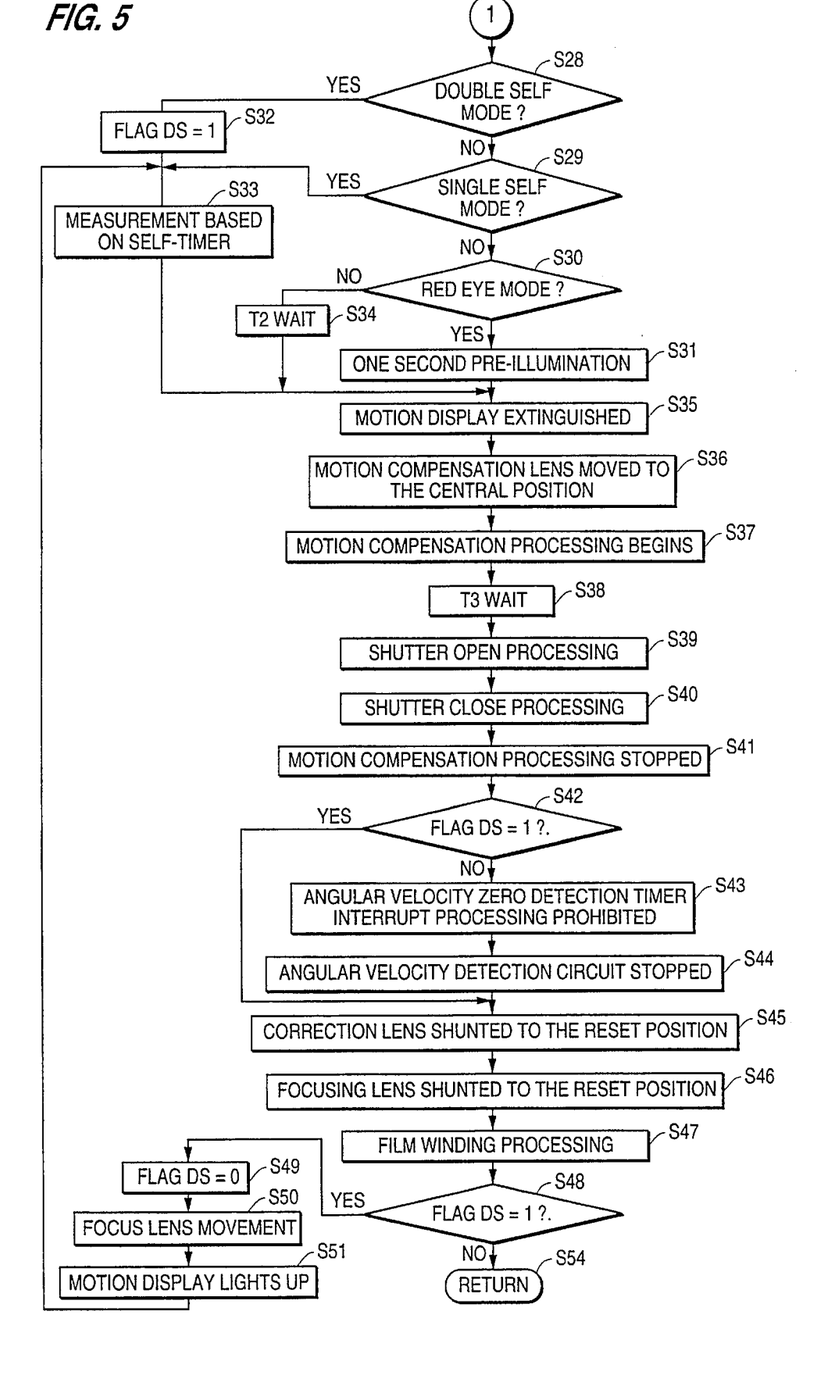

FIGS. 4 and 5 are flow charts illustrating the photographic processing of step S3 in FIG. 3, according to an embodiment of the present invention. As illustrated in FIGS. 4 and 5, during double self mode, the outputs of angular velocity detection circuits 21 and 22 are stabilized by continuing motion detection from a time when angular velocity detection circuits 21 and 22 are activated, until the photography of the second frame of the double self mode is completed.

Referring now to FIG. 4, the process starts in step S10. From step S10, the process moves to step S11, where a battery check is performed. More specifically, the voltage of the camera battery (not illustrated) is measured, and it is determined whether or not that voltage is at an adequate, operational voltage. In order to reliably measure the voltage of the battery, it is desirable to measure the voltage when a load is applied to the battery. Therefore, the voltage of the battery is measured in a state when, for example, motor drive circuits 6 and 7 are driving motors 3 and 4, respectively. If the voltage is not at an adequate, operational voltage in step S11, the process moves to a return at step S52. If the voltage is at an adequate, operational voltage in step S11, the process moves to step S12.

As previously described, CPU 2 includes a flag DS (not illustrated) to indicate whether or not the camera is in the first photographic frame of double self mode. Therefore, in step S12, the flag DS is initially set to "0". At a later time when CPU 2 confirms that the camera is in the first photographic frame of double self mode, flag DS will be changed from "0" to "1" (see step S32 in FIG. 5, discussed later).

From step S12, the process moves to step S13, where angular velocity detection circuits 21 and 22 are activated.

Once activated, angular velocity detection circuits 21 and 22 begin to detect motion affecting the camera, and produce angular velocity signals corresponding to the detected motion.

From step S13, the process moves to step S14, where angular velocity zero detection timer interrupt processing is permitted. Angular velocity zero detection timer interrupt processing operates, for example, by executing a timer interrupt at CPU 2 every time a specific period of time elapses. During the timer interrupt processing, the voltage level (referred to as the "angular velocity zero voltage") corresponding to the angular velocity zero is computed. A computation of the angular velocity zero voltage is performed to derive a reliable angular velocity by subtracting the angular velocity zero voltage from the output voltages of angular velocity detection circuits 21 and 22. In other words, the angular velocity zero voltage represents a reference level of the output signals of angular velocity detection circuits 21 and 22. The reference level corresponds to approximately no motion affecting the camera. Thus, when the amount of motion is later determined from the output voltages of angular velocity detection circuits 21 and 22, this reference level must be subtracted from the output voltages.

From step S14, the process moves to step S15, where signals are sent to light measurement circuit 9, light measurement processing is begun, and light measurement results are obtained. From step S15, the process moves to step S16, where signals are sent to focal point adjustment information detection circuit 10, focal point detection processing is begun, and focal point detection results are obtained. From step S16, the process moves to step S17, where automatic exposure (AE) calculations are executed based on the light measurement results obtained in step S15, and the aperture value and shutter speed are derived. From step S17, the process moves to step S18, where conventional FM ("flashmatic") calculations are executed based on the focal point detection results obtained in step S16, and the distance at which photography is possible when using an electronic flash device is derived.

From step S18, the process moves to step S19, where, in order to guarantee a sufficient time (for example, 300 ms) for the output of angular velocity detection circuits 21 and 22 to become stable, a wait time (referred to as the "angular velocity detection circuit stabilization time") T1 is derived based on the following equation (1), and the processing sequence waits in step S19 for the angular velocity detection circuit stabilization time T1 to lapse.

$$T1=300 \text{ ms}-(\text{light measurement processing time}+\text{focal point adjustment information detection time}) \quad (1)$$

Therefore, at step S19, the flow waits until 300 ms has elapsed since activating angular velocity detection circuits 21 and 22, considering the time required for light measurement in step S15 and focal point adjustment information detection in step S16.

Therefore, for example, even if light measurement processing or focal point detection processing is completed in a short amount of time by selecting a forced infinity mode and a long time mode, the processing subsequent to step S19 will be executed after 300 ms has elapsed from the time that power is supplied to angular velocity detection circuits 21 and 22.

From step S19, the process moves to step S20, where focus lens 101 is moved based on the results of focal point detection at step S16. The time required to move focus lens 101 is approximately 250–500 ms. When the camera is in forced infinity mode and infinity focal point detection, the time required to move focus lens 101 is approximately 250 ms. When the camera is set for the closest focal point detection, the time required to move focus lens 101 is approximately 500 ms. From step S20, the process moves to step S21, where the amount of motion is computed based on the output of angular velocity detection circuits 21 and 22, and signals corresponding to the amount of motion are sent to motion display device 11. In this manner, motion display device 11 executes a display corresponding to the amount of motion. Specifically, for example, the speed by which LEDs (not illustrated) inside motion display device 11 are made to flash is changed in correspondence with the amount of motion.

From step S21, the process moves to step S22, where it is determined whether or not release switch 15 is ON. If release switch 15 is not ON in step S21, the process moves to step S23. If release switch 15 is ON in step S21, the process moves to step S28 in FIG. 5. In step S23, it is determined whether or not half-push switch 14 is ON. If half-push switch is ON in step S23, the process moves to step S24, where the motion display of motion display device 11 is updated based on the output of angular velocity detection circuits 21 and 22. From step S24, the process returns to step S22.

If half-push switch is not ON in step S23, the process moves to step S25, where angular velocity zero detection timer interrupt processing is prohibited. From step S25, the process moves to step S26, where signals are sent to angular velocity detection circuits 21 and 22, and angular velocity detection is stopped. From step S26, the process moves to step S27, where the display on motion display device 11 is extinguished. From step S27, the process moves to a return at step S53.

In step S28 of FIG. 5, it is determined whether or not the camera is in double self mode. If the camera is not in double self mode in step S28, the process moves to step S29, where it is determined whether or not the camera is in single self mode. If the camera is not in single self mode in step S29, the process moves to step S30, where it is determined whether or not the camera is in red eye mode. If the camera is in red eye mode in step S30, the process moves to step S31, where pre-illumination is executed for one second prior to exposure.

If the camera is not in red eye mode in step S30, the process moves to step S34, where processing waits for a time T2 until the motion caused by pushing down the release button has ceased. This wait time T2 in step S34 is referred to as "shock avoidance time" T2. Shock avoidance time T2 allows an exposure to be executed after receiving large vibrations due to hand motions produced by pressing down the release button. Therefore, processing does not start until the shock avoidance time T2 elapses in step S34.

If the camera is in double self mode in step S28, the process moves to step S32, where flag DS is set to "1". From step S32, the process moves to step S33. Moreover, if the camera is in single self mode in step S29, the process moves to step S33. In step S33, a timer measurement is executed for the predetermined time of the self-timer.

From steps S31, S33 and S34, the process moves to step S35, where the display of motion display device 11 is extinguished. From step S35, the process moves to step S36, where compensation lens 102 is moved to a central position of photographic lens group 1 from a reset position defined as a specified initial position. From step S36, the process moves to step S37, where motion compensation processing begins. More specifically, the actual angular velocity corresponding to the amount of motion is derived based on the outputs of angular velocity detection circuits 21 and 22 and the calculated angular velocity zero voltage. Then, by using this actual angular velocity, the drive direction signals and drive duty signals are output to motor drive circuits 6 and 7 by calculating the amount of movement for compensation lens 102, and compensation lens 102 is shifted to compensate for motion affecting the camera.

From step S37, the process moves to step S38, where the processing waits for a time T3 (referred to as the "supplementary control time") until control of compensation lens 102 is stabilized. More specifically, immediately after motion compensation processing begins, there is a concern that there will be a large motion when the shutter is open and closed due to control of compensation lens 102 being unstable because of the reaction delay of motor drive circuits 6 and 7. Therefore, the shutter is opened and closed after control of compensation lens 102 has stabilized by waiting for the supplementary control time T3 to elapse. This supplementary control time T3 is, for example, about 20 ms.

From step S38, the process moves to step S39, where shutter open processing is executed to open the shutter. Then, after the specified time that was calculated by AE computations in step S17 has elapsed, the process moves to step S40, where shutter closing processing is executed to close the shutter. From step S40, the process moves to step S41, where motion control processing terminates. More specifically, the signal transmissions to motor drive circuits 6 and 7 are terminated, and compensation lens 102 is stopped.

From step S41, the process moves to step S42, where it is determined whether or not flag DS is "1". If flag DS is not "1" in step S42, the process moves to step S43, where angular velocity zero detection timer interrupt processing is prohibited. From step S43, the process moves to step S44, where angular velocity detection is terminated by sending signals to angular velocity detection circuits 21 and 22. From step S44, the process moves to step S45. Moreover, if the flag DS is "1" in step S42, the process moves to step S45.

In step S45, compensation lens 102 is shunted to the reset position (which is the initial position). From step S45, the process moves to step S46, where focus lens 101 is shunted to the reset position (which is the initial position). From step S46, the process moves to step S47, where signals are sent to a film feed circuit (not illustrated) which rewinds the film.

From step S47, the process moves to step S48, where it is determined whether or not flag DS is "1". If flag DS is not "1" in step S48, the process moves to step S54 and returns. If flag DS is "1" in step S48, the process moves to step S49, where, because the photography of one frame in the double self mode has been completed, the flag DS is set to "0" and the process moves to step S50.

In step S50, focus lens 101 is moved based on the focal point detection results of step S16. From step S50, the process moves to step S51, where motion display device 11 restarts the display in correspondence with the amount of motion. When the processing of step S51 is finished, the process returns to step S33, where the timer measurement of the second frame of double self mode is begun.

According to the processing sequence illustrated in FIGS. 4 and 5, during double self mode, the outputs of angular velocity detection circuits 21 and 22 are stabilized by continuing motion detection from a time when angular velocity detection circuits 21 and 22 are activated, until the photography of the second frame of the double self mode is completed.

Moreover, according to the processing sequence illustrated in FIGS. 4 and 5, the angular velocity zero voltage equivalent to the angular velocity zero can be continuously derived. That is, the angular velocity zero can be derived and updated for each angular velocity zero detection timer interrupt. As a result, the precision of the angular velocity zero voltage is improved, and it is possible to execute improved precision motion compensation processing for the second frame as compared to the first frame in double self mode.

Figure 6:
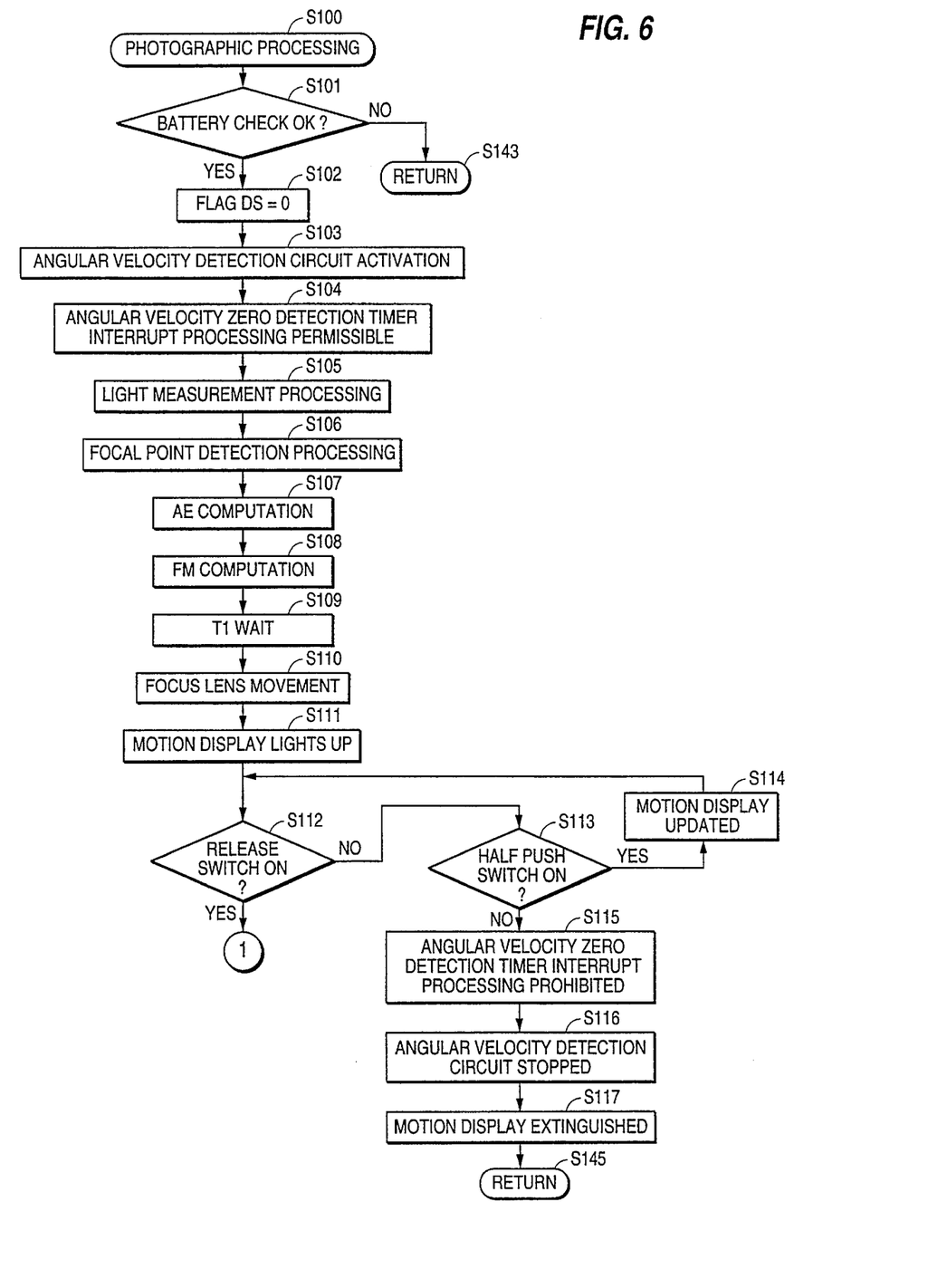
FIGS. 6 and 7 are flow charts illustrating the photographic processing of step S3 in FIG. 3, according to an additional embodiment of the present invention.
Figure 7:
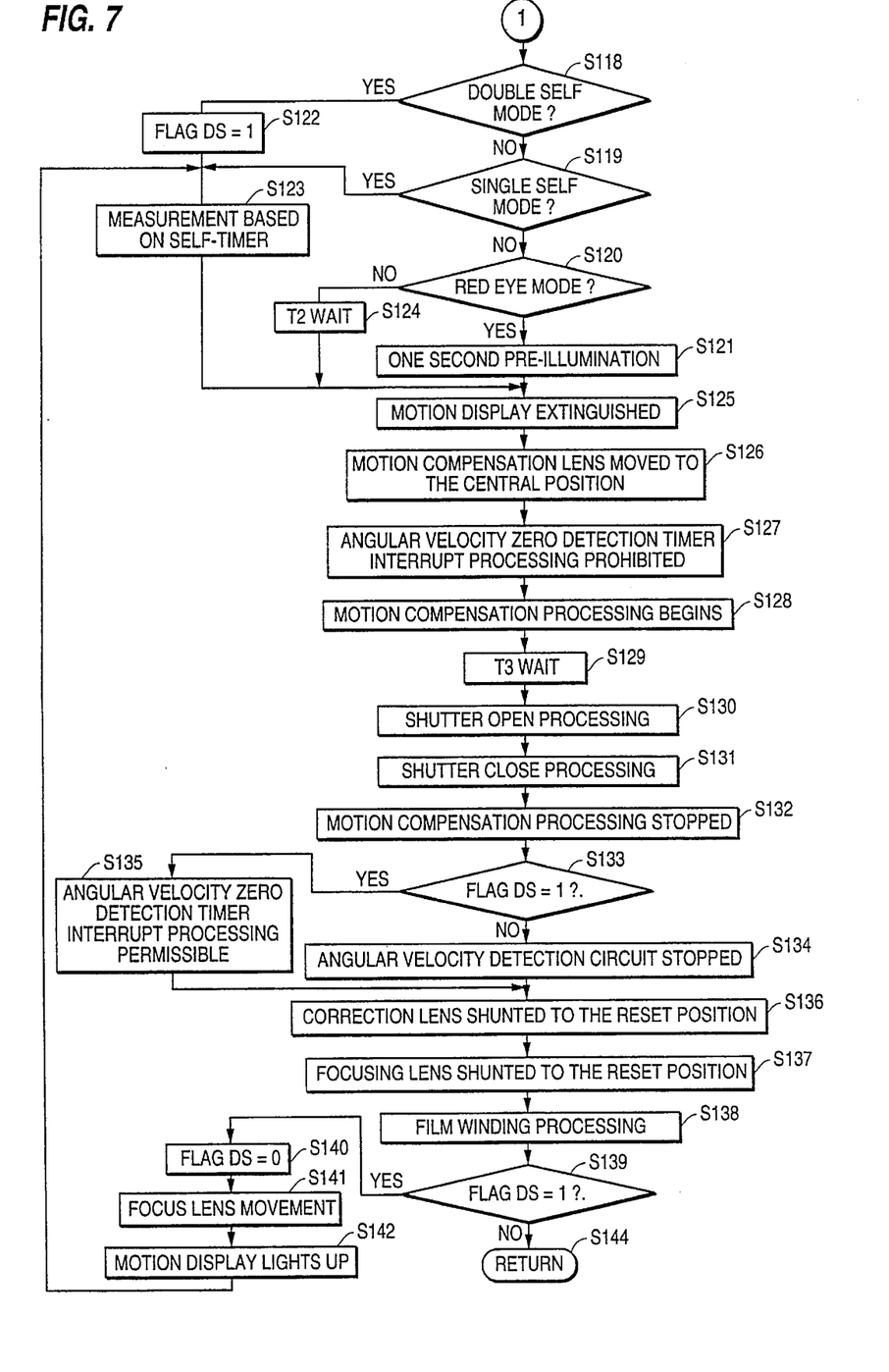

FIGS. 6 and 7 are flow charts illustrating the photographic processing of step S3 in FIG. 3, according to an additional embodiment of the present invention. More specifically, FIGS. 6 and 7 illustrate an embodiment of the present invention in which the detection of the angular velocity zero is prohibited when executing motion compensation control. More specifically, the detection of the angular velocity zero is prohibited when compensation lens 102 is being shifted to compensate for motion affecting the camera. The embodiment of the present invention as illustrated in FIGS. 6 and 7 can be compared to the embodiment of the present invention as illustrated in FIGS. 4 and 5 in which the detection of the angular velocity zero voltage is continuously derived until the second photograph is taken.

Referring now to FIG. 6, the process starts in step S100. From step S100, the process moves to step S101, where a battery check is performed. If the voltage is not at an adequate, operational voltage in step S101, the process moves to a return at step S143. If the voltage is at an adequate, operational voltage in step S101, the process moves to step S102.

As previously described, CPU 2 includes a flag DS (not illustrated) to indicate whether or not the camera is in the first photographic frame of double self mode. Therefore, in step S102, the flag DS is initially set to "0". At a later time when CPU 2 confirms that the camera is in the first photographic frame of double self mode, flag DS will be changed from "0" to "1" (see step S122 in FIG. 7, discussed later).

From step S102, the process moves to step S103, where angular velocity detection circuits 21 and 22 are activated. Once activated, angular velocity detection circuits 21 and 22 produce angular velocity signals corresponding to the detected motion. From step S103, the process moves to step S104, where angular velocity zero detection timer interrupt processing is permitted. Angular velocity zero detection timer interrupt processing operates, for example, by executing a timer interrupt at CPU 2 every time a specific period of time elapses. During the timer interrupt processing, the voltage level (referred to as the "angular velocity voltage") corresponding to the angular velocity zero is computed. A computation of the angular velocity zero voltage is performed to derive a reliable angular velocity by subtracting the angular velocity zero voltage from the output voltages of angular velocity detection circuits 21 and 22.

From step S104, the process moves to step S105, where signals are sent to light measurement circuit 9, light measurement processing is begun, and light measurement results are obtained. From step S105, the process moves to step S106, where signals are sent to focal point adjustment information detection circuit 10, focal point detection processing is begun, and focal point detection results are obtained. From step S106, the process moves to step S107, where automatic exposure (AE) calculations are executed based on the light measurement results obtained in step S105, and the aperture value and shutter speed are derived. From step S107, the process moves to step S108, where FM ("flashmatic") calculations are executed based on the focal point detection results obtained in step S106, and the distance is derived at which photography is possible when using an electronic flash device.

From step S108, the process moves to step S109, where, in order to guarantee a sufficient time (for example, 300 ms) for the output of angular velocity detection circuits 21 and 22 to become stable, a wait time (referred to as the "angular velocity detection circuit stabilization time") T1 is derived based on Equation (1), previously described, and the processing sequence waits in step S109 for the angular velocity detection circuit stabilization time T1 to lapse.

From step S109, the process moves to step S110, where focus lens 101 is moved based on the results of focal point detection at step S106. From step S110, the process moves to step S111, where the amount of motion is computed based on the output of angular velocity detection circuits 21 and 22, and signals corresponding to the amount of motion are sent to motion display device 11. In this manner, motion display device 11 executes a display corresponding to the amount of motion. Specifically, for example, the speed by which LEDs (not illustrated) inside motion display device 11 are made to flash is changed in correspondence with the amount of motion.

From step S111, the process moves to step S112, where it is determined whether or not release switch 15 is ON. If release switch 15 is not ON in step S112, the process moves to step S113. If release switch 15 is ON in step S112, the process moves to step S118 in FIG. 5. In step S113, it is determined whether or not half-push switch 14 is ON. If half-push switch is ON in step S113, the process moves to step S114, where the motion display of motion display device 11 is updated based on the output of angular velocity detection circuits 21 and 22. From step S114, the process returns to step S112.

If half-push switch is not ON in step S113, the process moves to step S115, where angular velocity zero detection timer interrupt processing is prohibited. From step S115, the process moves to step S116, where signals are sent to angular velocity detection circuits 21 and 22, and angular velocity detection is stopped. From step S116, the process moves to step S117, where the display on motion display device 11 is extinguished. From step S117, the process moves to a return at step S145.

In step S118 of FIG. 7, it is determined whether or not the camera is in double self mode. If the camera is not in double self mode in step S118, the process moves to step S119, where it is determined whether or not the camera is in single self mode. If the camera is not in single self mode in step S119, the process moves to step S120, where it is determined whether or not the camera is in red eye mode. If the camera is in red eye mode in step S120, the process moves to step S121, where pre-illumination is executed for one second prior to exposure.

If the camera is not in red eye mode in step S120, the process moves to step S124, where processing waits for a time T2 until the motion caused by pushing down the release button has ceased. This wait time T2 in step S124 is referred to as "shock avoidance time" T2. Shock avoidance time T2 allows an exposure to be executed after receiving large vibrations due to hand motions produced by pressing down the release button. Therefore, processing does not start until the shock avoidance time T2 elapses in step S124.

If the camera is in double self mode in step S118, the process moves to step S122, where flag DS is set to "1". From step S122, the process moves to step S123. Moreover, if the camera is in single self mode in step S119, the process moves to step S123. In step S123, a timer measurement is executed for the predetermined time of the self-timer.

From steps S121, S123 and S124, the process moves to step S125, where the display of motion display device 11 is extinguished. From step S125, the process moves to step S126, where compensation lens 102 is moved to a central position of photographic lens group 1 from a reset position defined as a specified initial position.

From step S126, the process moves to step S127, where angular velocity zero detection timer interrupt processing is prohibited.

From step S127, the process moves to step S128, where motion compensation processing begins. More specifically, the actual angular velocity corresponding to the amount of motion is derived based on the outputs of angular velocity detection circuits 21 and 22 and the calculated angular velocity zero voltage. Then, by using this actual angular velocity, the drive direction signals and drive duty signals are output to motor drive circuits 6 and 7 by calculating the amount of movement for compensation lens 102, and compensation lens 102 is shifted to compensate for motion affecting the camera. As can be seen by step S127 being executed before step S127, the angular velocity zero voltage is prohibited from being updated while compensation lens 102 is being shifted.

From step S128, the process moves to step S129, where the processing waits for a time T3 (referred to as the "supplementary control time") until control of compensation lens 102 is stabilized. More specifically, immediately after motion compensation processing begins, there is a concern that there will be a large motion when the shutter is open and closed due to control of compensation lens 102 being unstable because of the reaction delay of motor drive circuits 6 and 7. Therefore, the shutter is opened and closed after control of compensation lens 102 has stabilized by waiting for the supplementary control time T3 to elapse. This supplementary control time T3 is for example, about 20 ms.

From step S129, the process moves to step S130, where shutter open processing is executed to open the shutter. Then, after the specified time that was calculated by AE computations in step S107 has elapsed, the process moves to step S131, where shutter closing processing is executed to close the shutter. From step S131, the process moves to step S132, where motion control processing terminates. More specifically, the signal transmissions to motor drive circuits 6 and 7 are terminated, and compensation lens 102 is stopped.

From step S132, the process moves to step S133, where it is determined whether or not flag DS is "1". If flag DS is not "1" in step S133, the process moves to step S134, where angular velocity detection is terminated by sending a signal to angular velocity detection circuits 21 and 22. If flag DS is "1" in step S133, the process moves to step S135, where angular velocity zero detection timer interrupt processing is made permissible. From steps S135 and S134, the process moves to step S136, where compensation lens 102 is shunted to the reset position. From step S136, the process moves to step S137, where focus lens 101 is shunted to the reset position. From step S137, the process moves to step S138, where signals are sent to a film feed circuit (not illustrated) which rewinds the film.

From step S138, the process moves to step S139, where it is determined whether or not flag DS is "1". If flag DS is not "1" in step S139, the process moves to step S144 and returns. If flag DS is "1" in step S139, the process moves to step S140, where, because the photography of one frame in the double self mode has been completed, the flag DS is set to "0" and the process moves to step S141.

In step S141, focus lens 101 is moved based on the focal point detection results of step S106. From step S141, the process moves to step S142, where motion display device 11 restarts the display in correspondence with the amount of motion. When the processing of step S142 is finished, the process returns to step S123, where the timer measurement of the second frame of double self mode is begun.

According to embodiments of the present invention as illustrated in FIGS. 6 and 7, detection of the angular velocity zero voltage is prohibited when executing motion compensation control. Therefore, it is possible to conduct motion compensation control using an inexpensive microcomputer that cannot compute at high speeds. Thus, camera costs can be minimized.

According to embodiments of the present invention as illustrated in FIGS. 4-7, motion detection processing is executed after performing a battery check; however, motion detection processing may be executed promptly by pressing the release button to the half-push position without performing a battery check.

Further, according to embodiments of the present invention, the angular velocity produced by motion is detected using angular velocity detection circuits; however, instead of using angular velocity detection circuits, sensor circuits which detect acceleration, positional changes, or other such characteristics may be provided.

According to embodiments of the present invention as illustrated in FIGS. 4-7, motion display is executed after angular velocity detection circuit stabilization time T1 has elapsed; however, motion display may also be executed after the shortest time required for the computation of the angular velocity zero voltage (for example, 900 ms) has elapsed after beginning a measurement on a motion compensation prohibition timer. This way, reliability of the motion display may be further improved.

As a focal point detection method of the focal point adjustment information detection circuit 10, it is possible to apply a variety of methods. For example, a method can be based on a distance measurement of the distance to the subject. Moreover, a method can be based on an investigation of conditions of the focal plane of the photographic lens.

Moreover, according to the above embodiments of the present invention, a self-timer can time up to two separate photographs. However, a self-timer can be used which can time three or more photographs. The self-timer can also be used for multiple photographs during bracketing photography.

According to the above embodiments of the present invention, the output of a motion detection unit (for example, angular velocity detection circuits 21 and 22) can be stabilized by continuing motion detection until a final photography is completed during multiple photographs. For example, if taking photographs in double self mode, motion detection is continued from the beginning of motion detection until exposure processing of the second frame of double self mode is complete. Consequently, the precision of motion compensation is improved by executing motion compensation based on the detected amount of motion for the previous photograph.

According to the above embodiments of the present invention, the computation of a reference level (that is, the angular velocity zero voltage) is performed until the final photograph of multiple photographs is completed. Therefore, the reference level can be computed with high precision. Consequently, the precision of motion compensation can be further increased by executing motion compensation based on the reference level.

According to the above embodiments of the present invention, the computation of the reference level can be prohibited when executing motion compensation control. Therefore, an inexpensive microcomputer, which cannot calculate at high speeds, can be used.

According to the above embodiments of the present invention, a camera performs high precision motion compensation while multiple, serial photographs are taken, by stabilizing the output signal of a motion sensor until the final photograph is taken. An exposure control mechanism (for example, CPU 2 performing steps S28, S32, S48 and S33 in FIG. 5) causes the camera to take a first photograph after a first time period elapses from the initiation of exposure, and to take a second photograph after a second time period elapses from the first photograph being taken. The first time period can be equal to the second time period (for example, see FIG. 5, where the first time period and the second time period are both performed by a self-timer in step S33, and are therefore equal). A motion detector (for example, angular velocity detection circuits 21 and 22) continuously detects motion affecting the camera prior to the first photograph being taken until after the second photograph is taken, and produces a corresponding output signal (for example, see step S13 in FIG. 4, and step S44 in FIG. 5). A reference level mechanism (for example, CPU 2) determines a reference level from the output signal of the motion detector. The reference level is a level of the output signal which indicates that approximately no motion is affecting the camera. The reference level mechanism updates the reference level prior to the first photograph being taken until after the second photograph is taken, to produce a current reference level (for example, CPU 2 performing steps S14 in FIG. 4 and step S43 in FIG. 5). In addition, a motion compensation mechanism (for example, CPU 2 controlling motor drive circuits 6 and 7 to drive motors 3 and 4, respectively, thereby moving compensation lens 102) receives the current reference level from the reference level mechanism and the output signal of the motion detector, and accordingly compensates for motion affecting the camera.

The camera also includes a compensation lens (for example, compensation lens 102) which is movable to compensate for motion affecting the camera. A motion compensation mechanism receives the current reference level from the reference level mechanism and the output signal of the motion detector, and moves the compensation lens to compensate for motion affecting the camera in accordance with the current reference level and the output signal of the motion detector. The reference level mechanism can be prohibited from updating the reference level while the motion compensation mechanism is moving the compensation lens (for example, see step S127 in FIG. 7). An initiation unit (for example, release switch 15) is used to initiate exposure.

The present invention is described as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems and various optical projection systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera which takes a first photograph upon initiation of exposure, and then takes a second photograph after the first photograph is taken, the camera comprising:

an exposure control mechanism causing the camera to take the first photograph after a first time period elapses from the initiation of exposure, and to take the second photograph after a second time period elapses from the first photograph being taken; and a motion detector continuously detecting motion affecting the camera prior to the first photograph being taken until after the second photograph is taken.

2. A camera as in claim 1, wherein the motion detector produces an output signal corresponding to the amount of detected motion, the camera further comprising:

a reference level mechanism receiving the output signal of the motion detector and determining a reference level of the output signal which indicates that approximately no motion is affecting the camera, the reference level mechanism updating the determined reference level prior to the first photograph being taken until after the second photograph is taken, to produce a current reference level; and a motion compensation mechanism receiving the current reference level from the reference level mechanism and the output signal of the motion detector, and compensating for motion affecting the camera in accordance with the current reference level and the output signal of the motion detector.

3. A camera as in claim 2, further comprising:

a compensation lens which is movable to compensate for motion affecting the camera, wherein
the motion compensation mechanism compensates for motion by moving the compensation lens, and
the reference level mechanism is prohibited from updating the reference level while the motion compensation mechanism is moving the compensation lens.

4. A camera as in claim 1, further comprising an initiation unit to initiate exposure.

5. A camera as in claim 2, further comprising an initiation unit to initiate exposure.

6. A camera as in claim 3, further comprising an initiation unit to initiate exposure.

7. A camera as in claim 1, wherein the first time period is equal to the second time period.

8. A camera as in claim 2, wherein the first time period is equal to the second time period.

9. A camera as in claim 3, wherein the first time period is equal to the second time period.

10. A camera which takes a first photograph upon initiation of exposure, and then takes a second photograph after the first photograph is taken, the camera comprising:

an exposure control mechanism causing the camera to take the first photograph after a first time period elapses from the initiation of exposure, and to take the second photograph after a second time period elapses from the first photograph being taken; a motion detector continuously detecting motion affecting the camera prior to the first photograph being taken until after the second photograph is taken, and producing an output signal corresponding to the amount of detected motion;

a reference level mechanism receiving the output signal of the motion detector and determining a reference level of the output signal which indicates that approximately no motion is affecting the camera, the reference level mechanism updating the determined reference level prior to the first photograph being taken until after the second photograph is taken, to produce a current reference level; and a motion compensation mechanism receiving the current reference level from the reference level mechanism and the output signal of the motion detector, and compensating for motion affecting the camera in accordance with the current reference level and the output signal of the motion detector.

11. A camera which takes a first photograph upon initiation of exposure, and then takes a second photograph after the first photograph is taken, the camera comprising:

an exposure control mechanism causing the camera to take the first photograph after a first time period elapses from the initiation of exposure, and to take the second photograph after a second time period elapses from the first photograph being taken; a motion detector continuously detecting motion affecting the camera prior to the first photograph being taken until after the second photograph is taken, and producing an output signal corresponding to the amount of detected motion;

a reference level mechanism receiving the output signal of the motion detector and determining a reference level of the output signal which indicates that approximately no motion is affecting the camera, the reference level mechanism updating the determined reference level prior to the first photograph being taken until after the second photograph is taken, to produce a current reference level;

a compensation lens which is movable to compensate for motion affecting the camera; and a motion compensation mechanism receiving the current reference level from the reference level mechanism and the output signal of the motion detector, and moving the compensation lens to compensate for motion affecting the camera in accordance with the current reference level and the output signal of the motion detector, wherein the reference level mechanism is prohibited from updating the reference level while the motion compensation mechanism is moving the compensation lens.

* * * * *

UNITED STATES PATENT AND TRADEMARK OFFICE
CERTIFICATE OF CORRECTION

PATENT NO. : 5,589,904
DATED : December 31, 1996
INVENTOR(S) : Keisi URATA et al.

It is certified that error appears in the above-indentified patent and that said Letters Patent is hereby corrected as shown below:

<u>Title page</u>, [56], column 1, "5,421,334" should be --5,241,334--.

Signed and Sealed this

Twenty-fourth Day of June, 1997

Attest:

BRUCE LEHMAN

Attesting Officer     Commissioner of Patents and Trademarks